(Model.) 3 Sheets—Sheet 1.

G. GLYDON & W. GAY.
MEANS FOR CONTROLLING SUPPLY OF STEAM TO INJECTORS, EJECTORS, OR OTHER APPLIANCES.

No. 596,110. Patented Dec. 28, 1897.

WITNESS:
C. Nordford
C. Grist

INVENTORS
George Glydon and
William Gay,
BY
Syn Tater & Co
ATTORNEYS.

(Model.)

G. GLYDON & W. GAY.
MEANS FOR CONTROLLING SUPPLY OF STEAM TO INJECTORS, EJECTORS, OR OTHER APPLIANCES.

No. 596,110.

Patented Dec. 28, 1897.

3 Sheets—Sheet 2.

WITNESS:

INVENTORS
George Glydon
William Gay
BY
ATTORNEYS (Model.) 3 Sheets—Sheet 3.
G. GLYDON & W. GAY.
MEANS FOR CONTROLLING SUPPLY OF STEAM TO INJECTORS,
EJECTORS, OR OTHER APPLIANCES.
No. 596,110. Patented Dec. 28, 1897.
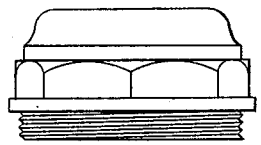
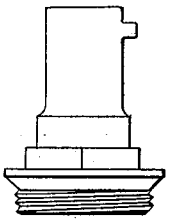
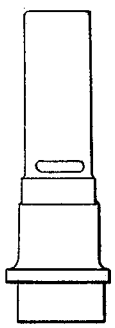
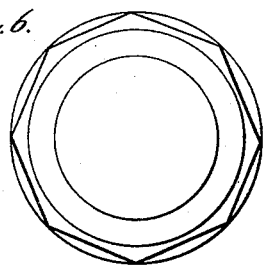
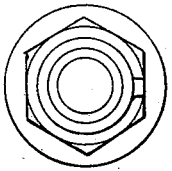
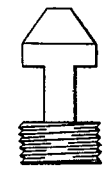
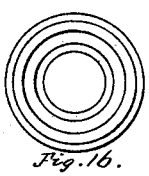
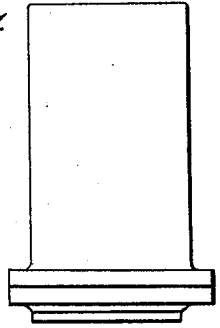
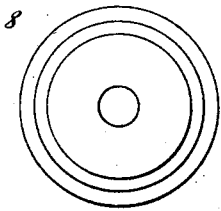
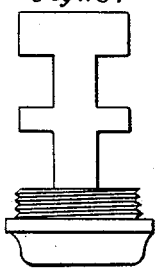
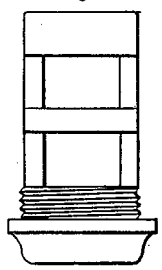
WITNESS:
INVENTORS
George Glydon and
William Gay
BY
Edgar Tate & Co.
ATTORNEYS

UNITED STATES PATENT OFFICE.

GEORGE GLYDON AND WILLIAM GAY, OF BIRMINGHAM, ENGLAND.

MEANS FOR CONTROLLING SUPPLY OF STEAM TO INJECTORS, EJECTORS, OR OTHER APPLIANCES.

SPECIFICATION forming part of Letters Patent No. 596,110, dated December 28, 1897.

Application filed April 10, 1896. Serial No. 586,920. (Model.) Patented in England November 3, 1894, No. 21,110.

*To all whom it may concern:*

Be it known that we, GEORGE GLYDON and WILLIAM GAY, residents of Birmingham, in the county of Warwick and Kingdom of Great Britain, have invented certain new and useful Improvements in the Method of Controlling the Supply of Steam and Water or other Fluids to Injectors, Ejectors, or other Appliances, of which the following is a specification, reference being had to the accompanying drawings, forming a part thereof, in which similar letters of reference indicate corresponding parts.

The object of our invention is to enable an unskilled person to perform the action of regulating or controlling the supply of steam, water, or other liquids or fluids to injectors, ejectors, and other apparatus in a more efficient manner than has heretofore been possible, and the device which forms the basis of this application is the same as that for which Letters Patent were granted in Great Britain November 3, 1894, No. 21,110.

The invention is fully disclosed in the following specification, of which the accompanying drawings form a part, in which—

Figure 1:
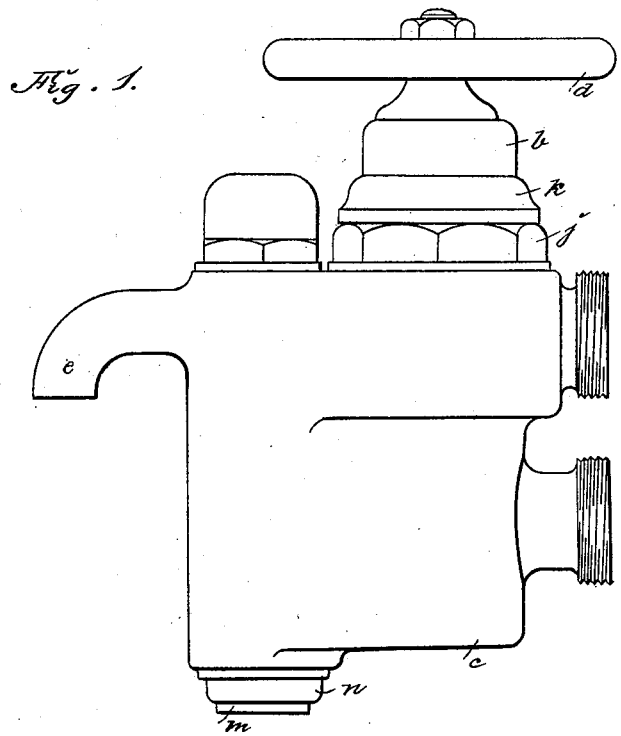
Figure 2:
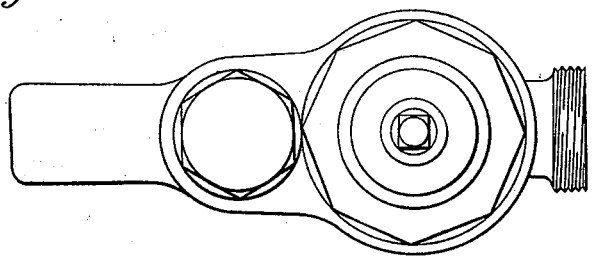
Figure 3:
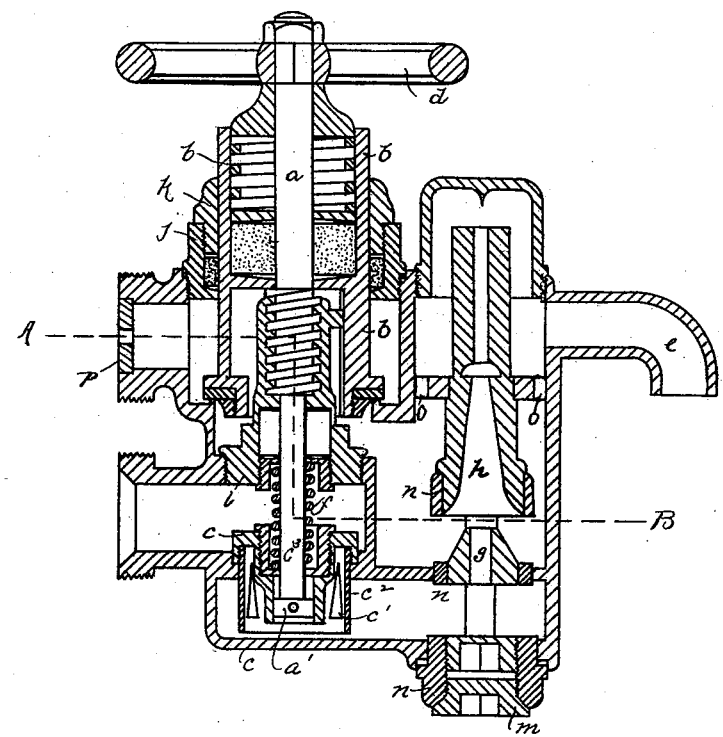
Figure 4:
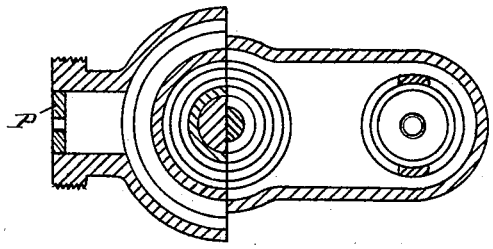

Figure 1 is a side elevation of our improved apparatus; Fig. 2, a plan view thereof with the operating wheel or handle removed; Fig. 3, a central vertical section thereof; Fig. 4, a sectional plan view on the line A B of Fig. 3. Figs. 5 and 6 are side and plan views, respectively, of the packing-glands for the water-valves. Figs. 7 and 8 are side and plan views, respectively, of the water-valve which we employ. Figs. 9 and 10 are side and plan views, respectively, of a screw-nut which is employed in connection with a water-valve which forms a part of the invention. Figs. 11 and 12 are side and plan views of the steam-valve; Fig. 13, a side elevation of the combining and delivery cone or nozzle; Fig. 14, a side elevation of a steam cone or nozzle; Fig. 15, a side elevation of a screw-plug which is employed in connection therewith, and Figs. 16 and 17 are opposite side elevations of the casing for the cones shown in Figs. 13 and 14.

In Fig. 3 the apparatus which we employ is shown with the spindle $a$ screwed down, the water-valve $b$ and the steam-valve $c$ being both closed on their outer sides. On turning the hand-wheel or handle $d$ to raise the spindle $a$ the following chain of actions will take place: The rising spindle $a$ will begin to lift the water-valve $b$ from its seat, thus allowing cold water to pass through the apparatus by means of the passages $o$ $o$ and the delivery-nozzle $h$ and the spout $e$. As the screw-spindle $a$ rises farther the collar $a'$ thereon will overcome the pressure of the steam and the coiled spring $f$ will raise the steam-valve $c$ from its seat, thus allowing steam to begin to mix with the inflowing cold water by means of the injector-nozzles $g$ and $h$, and the amount of steam is graduated by the ports $c'$ in the cylindrical casing $c^2$ of the steam-valve.

To obtain water of a high temperature, we reduce the area of the cold-water inlet by inserting a disk of metal, which is provided with a hole or opening through it, or by other suitable means, so that the amount of cold water is insufficient to supply the combining-cone $h$ when a full supply of steam is admitted. By this means a partial vacuum is formed around the inlet to the nozzles, which draws back through the passages $o$ $o$ a portion of the water which has been already heated, and this mixing with the inflowing water supplies to the combining-nozzle $h$ water which is already partially heated, and thereby increases the temperature. In order to close the valves, it will be seen that this operation is reversed—that is to say, the steam-valve $c$ is first closed by the pressure of the coiled spring $f$, and then the water-valve $b$ is lowered onto its seat. Finally the complete screwing down of the spindle $a$ forces the steam-valve $e$ tightly onto its seat. These successive actions of the valve $b$ and the steam-valve $c$ in opening and closing by one spindle in conjunction with the action of the springs $f$ and $i$ and the heating of the feed-water form important features in our invention.

It will thus be seen that we accomplish the object of our invention by means of a device which is simple in construction and operation and one which is well adapted to produce the result for which it is intended.

Having fully described our invention, we claim as new and desire to secure by Letters Patent—

1. In an apparatus for controlling the supply of steam, water, or other liquids, or fluids to injectors, ejectors and other apparatus, the combination with a suitable casing, and suitable passages therethrough, of a water-valve, and a steam-valve which control said passages, and which are operated by one screw-spindle, and two springs, said casing and passages being also provided with combining-nozzles, and a suitable outlet, substantially as shown and described.

2. In an apparatus for controlling the supply of steam, water, or other liquids, or fluids, to injectors, ejectors and other apparatus, the combination with a suitable casing, having two ingress ports or passages, and a suitable egress port or passage, and passages extending therethrough, and communicating with said ingress ports or passages and said egress port or passage, of a steam-valve, having a cylindrical casing and side ports therein, in combination with a water-valve, both of said valves being moved, and controlled in opening and closing by one screw-spindle, and two springs, substantially as shown and described.

3. In an apparatus for controlling the supply of steam, water, or other liquids or fluids, to injectors, ejectors, and other apparatus, the combination with a casing of a spindle $a$; valve $b$; steam-valve $c$; a water-inlet pipe, a disk mounted therein and having a hole or opening; a steam-inlet pipe below said water-inlet pipe, a mixing-chamber in which is mounted a mixing-nozzle $h$; a diaphragm inclosing said mixing-nozzle and provided with passages $o, o$, a steam-nozzle $g$ mounted below said nozzle $h$, and an escape-nozzle $e$, and means for controlling the supply of steam, substantially as shown and described and for the purpose set forth.

In testimony that we claim the foregoing as our invention we have signed our names, in presence of the subscribing witnesses, this 25th day of October, 1895.

GEORGE GLYDON.
WILLIAM GAY.

Witnesses:
EMORY DAVIES,
MATTHEW HENRY PURSALL.